United States Patent
Kissel, Jr.

(10) Patent No.: US 7,665,422 B2
(45) Date of Patent: Feb. 23, 2010

(54) ELECTRIC ROTARY PET BRUSH

(76) Inventor: Waldemar F. Kissel, Jr., 3600 NW. 43rd St., Suite C-1, Gainesville, FL (US) 32606

(*) Notice: Subject to any disclaimer, the term of this patent is extended or adjusted under 35 U.S.C. 154(b) by 106 days.

(21) Appl. No.: 12/043,504

(22) Filed: Mar. 6, 2008

(65) Prior Publication Data

US 2009/0223008 A1 Sep. 10, 2009

Related U.S. Application Data

(60) Provisional application No. 60/905,334, filed on Mar. 5, 2007.

(51) Int. Cl.
*A01K 13/00* (2006.01)
*A46B 13/02* (2006.01)

(52) U.S. Cl. .................... 119/609; 119/664; 15/48; 15/23

(58) Field of Classification Search ............... 119/609, 119/610, 628, 600, 625, 612, 608, 611, 615, 119/626, 664, 663; 15/23, 48; *A01K 13/00; A46B 13/02*
See application file for complete search history.

(56) References Cited

U.S. PATENT DOCUMENTS

| 026,313 | A | | 11/1859 | Wheeler |
|---|---|---|---|---|
| 559,673 | A | | 5/1896 | Cafferty, Jr. |
| 921,143 | A | * | 5/1909 | mylchreest ............... 119/608 |
| 1,340,040 | A | | 5/1920 | Gasser |
| 1,525,585 | A | * | 2/1925 | McDowell ............... 15/23 |
| 1,643,823 | A | | 9/1927 | Sever et al. |
| 2,172,024 | A | | 9/1939 | Haluss |
| 2,439,344 | A | | 4/1948 | Miller |
| 2,753,583 | A | | 7/1956 | Jepson |
| 3,183,591 | A | | 5/1965 | Dumont |
| 3,813,720 | A | | 6/1974 | Sylvie |
| 3,894,547 | A | | 7/1975 | Scivoletto |
| 4,083,327 | A | | 4/1978 | Dowdy |
| 4,084,282 | A | | 4/1978 | Calvert |
| 5,040,339 | A | | 8/1991 | Warner |
| 5,211,131 | A | | 5/1993 | Plyler |
| 5,339,840 | A | | 8/1994 | Koppel |
| 5,509,378 | A | | 4/1996 | Kimura |
| 5,864,911 | A | | 2/1999 | Arnoux et al. |
| 6,158,073 | A | | 12/2000 | Jiovanni |
| 6,324,713 | B1 | | 12/2001 | Barkley |
| 6,325,021 | B1 | | 12/2001 | Farina |
| 6,427,633 | B1 | | 8/2002 | Ogden |
| 2001/0037772 | A1 | * | 11/2001 | Huddleston ............... 119/626 |
| 2007/0033758 | A1 | * | 2/2007 | Wang ............... 15/169 |
| 2007/0169720 | A1 | * | 7/2007 | Roy ............... 119/615 |

* cited by examiner

*Primary Examiner*—Son T. Nguyen
*Assistant Examiner*—Shadi Baniani
(74) *Attorney, Agent, or Firm*—Gray Robinson, P.A.

(57) ABSTRACT

Disclosed is a self cleaning rotary brush with means for accumulating collected hair for disposal. The invention includes a primary cleaning cylinder with a series of tines that are adapted to clean the fur of the animal. The invention further includes a secondary cleaning cylinder with associated tines that are designed to intermesh with the tines of the primary cylinder. A collection tray is located to the rear of the secondary cleaning cylinder. As fur is collected by the primary cylinder, it is removed by the tines of the secondary cylinder. Thereafter, as the secondary tines come into contact with the edge of the collection tray, the fur is deposited within the collection tray for subsequent disposal.

1 Claim, 5 Drawing Sheets

ELECTRIC ROTARY PET BRUSH

CROSS-REFERENCE TO RELATED APPLICATIONS

This application claims priority to co-pending provisional patent application entitled "Electric Rotary Pet Brush" filed on Mar. 5, 2007 under application Ser. No. 60/905,334. The contents of this co-pending application are incorporated herein by reference.

BACKGROUND OF THE INVENTION

DESCRIPTION OF THE BACKGROUND ART

Pet brushes are known in the prior art. For example, U.S. Pat. No. 4,083,327 to Dowdy discloses an animal grooming apparatus and process. The apparatus includes an electric motor that drives a drive pulley and driven pulley. A belt assembly provides a massaging action and combs loose hair.

Additionally, U.S. Pat. No. 2,172,024 to Haluss discloses an electric hair brush with shaft mounted tufts for combing hair. The tufts co-act with a stationary tuft to remove dirt and debris.

Lastly, U.S. Pat. No. 26,313 to Wheeler discloses a grooming machine with a comb and a brush. Comb routes material to a first receptacle while brush routes material to a second receptacle.

Although each of the above referenced inventions achieves its own individual objective, none of the background art discloses a rotary pet brush that is self cleaning.

SUMMARY OF THE INVENTION

It is, therefore, one of the objects of this invention to provide a rotary brush with interacting tines whereby the brush is self cleaning.

It is another object of this invention to provide a rotary pet brush with a safety guard to prevent the animal from being injured.

It is still another object of this invention to provide a rotary pet brush wherein hair can be easily collected for subsequent disposal.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The invention relates to a self cleaning rotary brush with means for accumulating collected hair for disposal. The invention includes a primary cleaning cylinder with a series of tines that are adapted to clean the fur of the animal. The invention further includes a secondary cleaning cylinder with associated tines that are designed to intermesh with the tines of the primary cylinder. A collection tray is located to the rear of the secondary cleaning cylinder. As fur is collected by the primary cylinder, it is removed by the tines of the secondary cylinder. Thereafter, as the secondary tines come into contact with the edge of the collection tray, the fur is deposited within the collection tray for subsequent disposal. The various features of the present invention, and the manner in which they interrelate, will be described in greater detail hereinafter.

Figure 1:
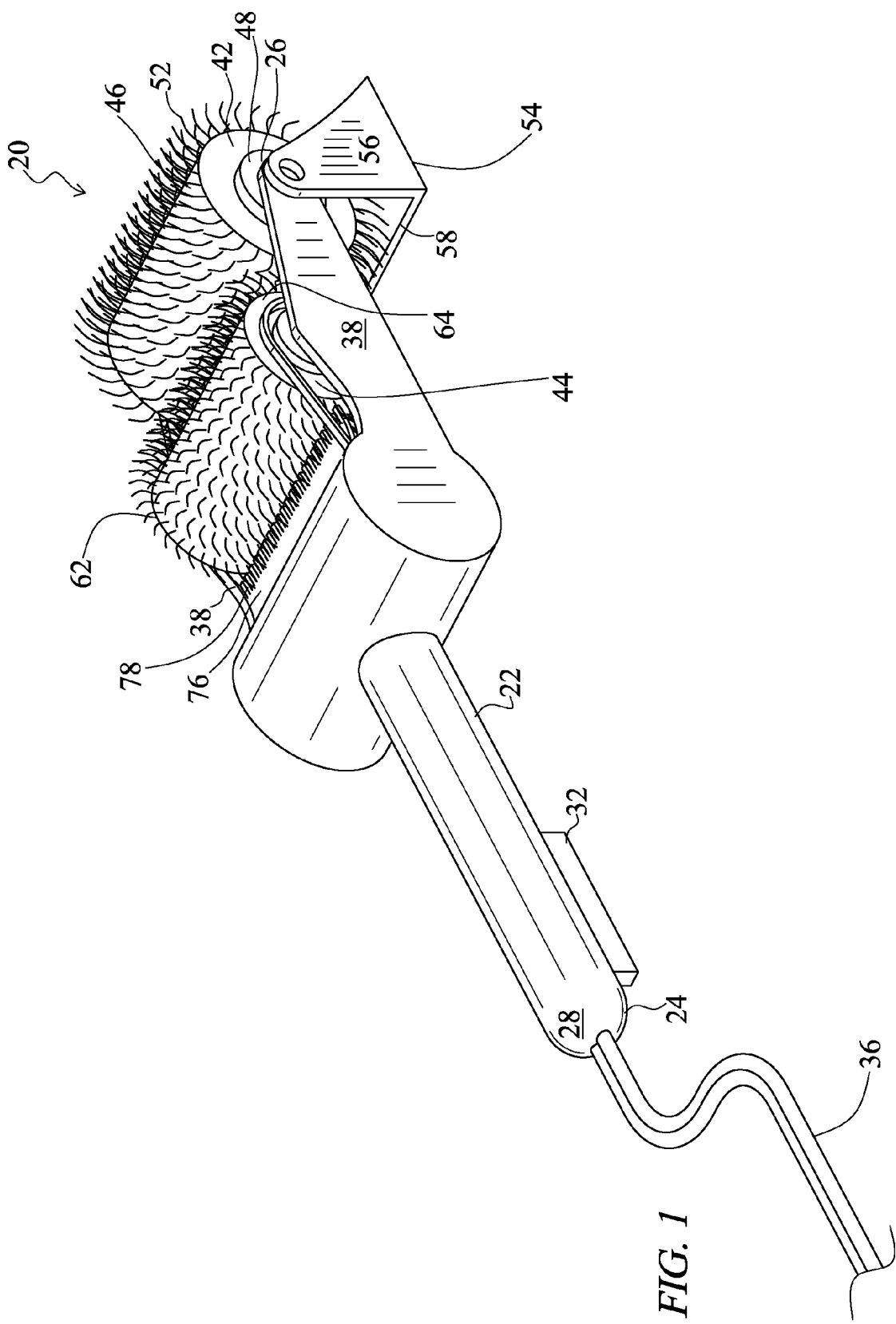
FIG. 1 is a perspective view of the rotary brush of the present invention.

With reference now to FIG. 1, the brush 20 of the present invention is depicted. As illustrated, brush 20 is formed from a housing 22 that includes proximal and distal ends (24 and 26, respectively). The proximal end 24 includes a handle 28 with an associated power switch 32. An electric motor 34 (note FIG. 6) is positioned within housing 22 and is used in powering brush 20. A power cord 36 is included for supplying electricity to motor 34. The electric motor 34 can be any of a variety of electrical motors commonly used for handheld appliances. The distal end 26 of housing 22 includes opposing arms 38 for rotatably mounting the primary and secondary cylinders (42 and 44, respectively), in a manner more fully described hereinafter.

Figure 6:
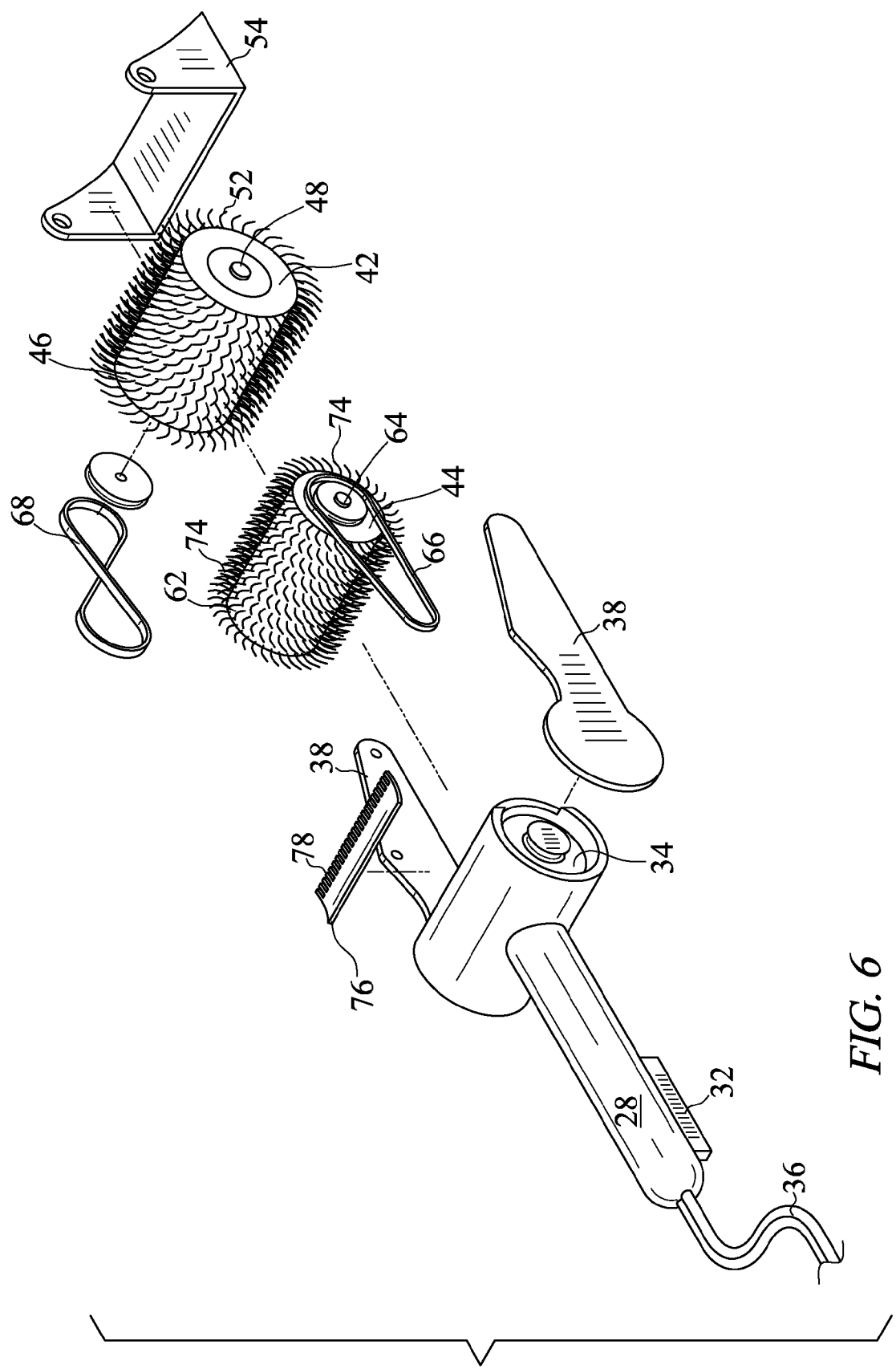
FIG. 6 is an exploded view of the pet brush of the present invention.

As best illustrated in the exploded view of FIG. 6, the primary cleaning cylinder 42 is defined by an outer cylindrical surface 46 and opposing ends 48. The opposing ends 48 are rotatably coupled between the opposing arms 38 of the housing 22 via bearings so as to permit the free rotation of the cylinder 42. Cylinder 42 is coupled the electric motor, whereby rotational movement is imparted to cylinder 42. In the preferred embodiment, the primary cylinder 42 is rotated in a clockwise direction as noted in FIG. 1. In other words, the primary cylinder 42 rotates in a direction towards the distal end 26 of housing 22.

The outer surface of the cylinder supports 46 a number of tines 52. These tines 52 can be integral with the cylinder 46 or they can be attached with a suitable adhesive. These tines are used in cleaning the fur of an animal. The tines can be formed from any number of materials. For example, the tines 52 can be small wire bristles or they can be made from a softened rubber to avoid any injury to the animal.

During the cleaning process, a guard 54 is employed to protect the underlying skin of the animal. This guard 54 includes opposing sides 56 that are rotatably coupled to the opposing ends 48 of the primary cylinder 42 as well as to the opposing arms 38 of the housing 22. Guard 54 further includes an arcuate shield 58 that is integrally formed between the opposing sides 56 of the guard 54. By way of the rotatable interconnection, shield 58 can be selectively positioned at any of a number of radial positions relative to the primary cleaning cylinder 42. Preferably the opposing sides 56 of the guard 54 are long enough such that the guard is positioned at a distance above the tines 52 of the cylinder 42.

Figure 4:
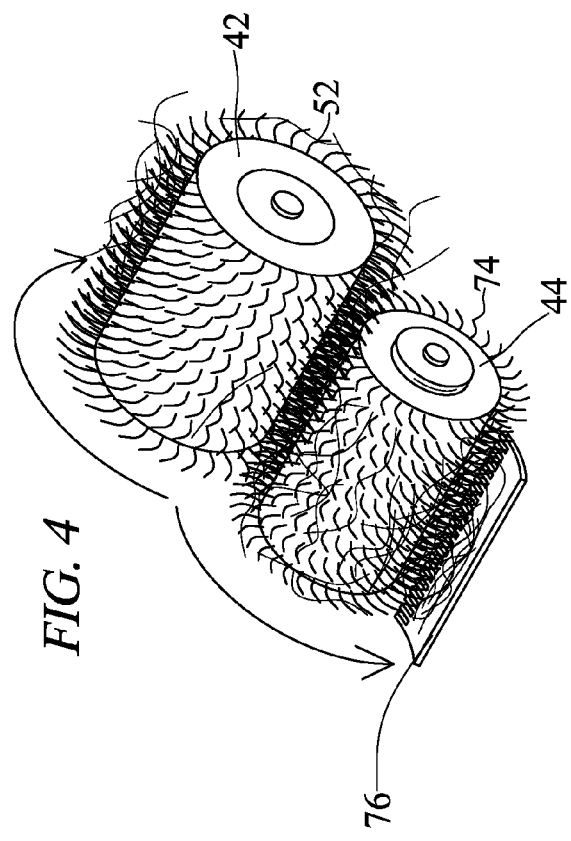
FIG. 4 is a detailed view showing the intermeshing of the primary and secondary cylinders.
Figure 2:
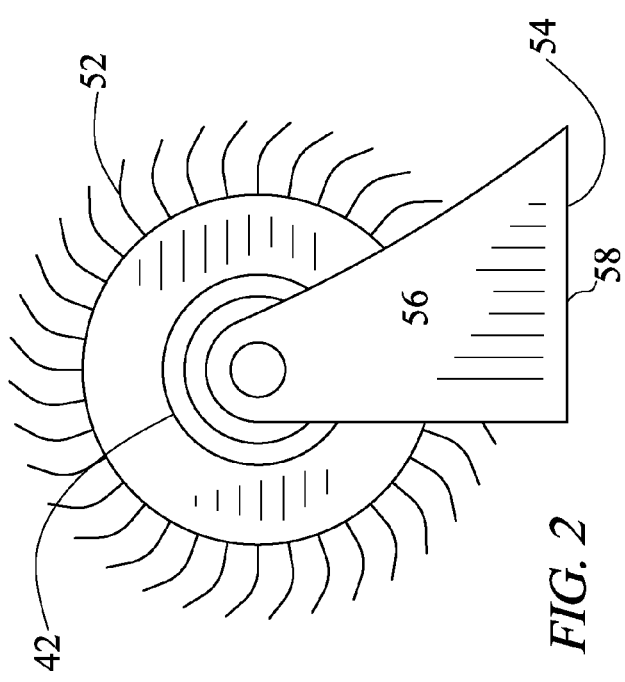
FIG. 2 is a detailed view of the primary cleaning cylinder.
Figure 3:
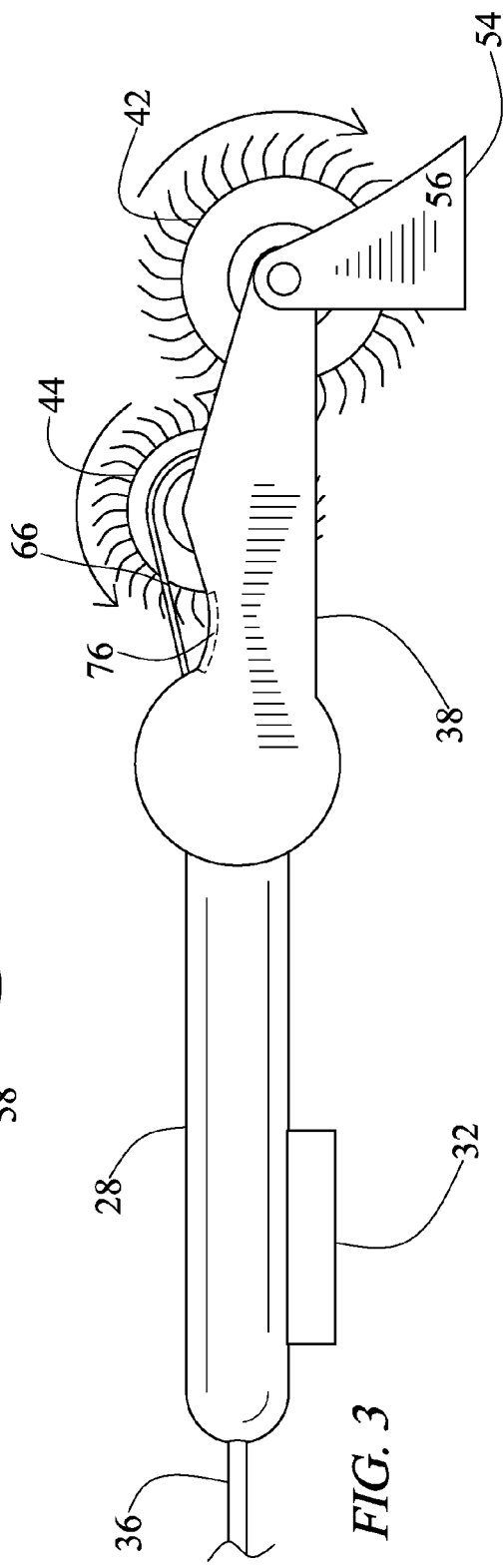
FIG. 3 is a side elevational view of the pet brush of the present invention.
Figure 7:
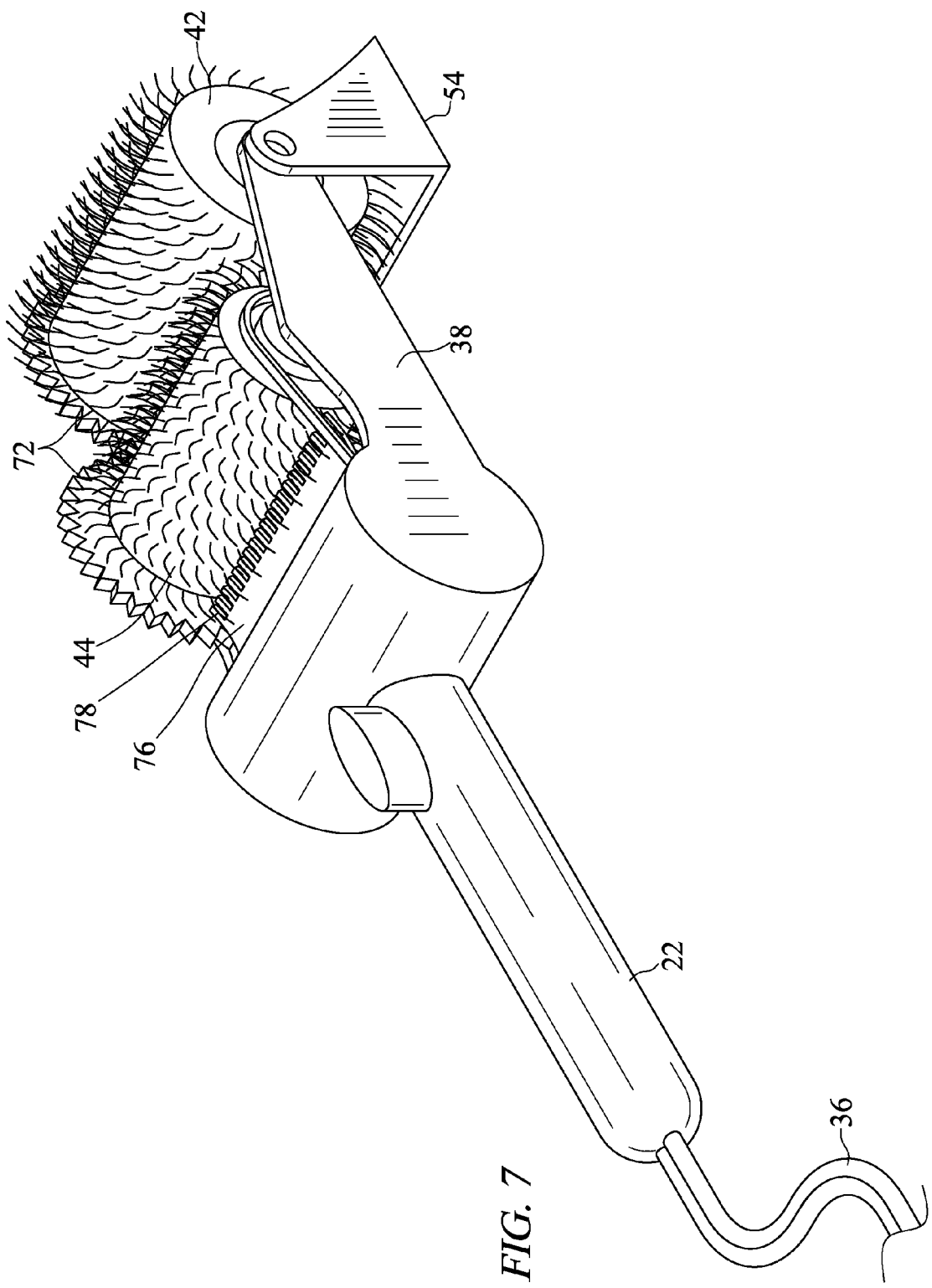
FIG. 7 is a view of an alternate embodiment of the present invention.

With continuing reference to FIG. 1, the secondary cleaning cylinder 44 is described. The secondary cylinder 44 shares a similar construction with the primary cylinder 42. Namely, the secondary cylinder 44 includes a smooth outer surface 62 and opposed ends 64 that are rotatably coupled to the opposing arms 38 of the housing 22. In the preferred embodiment, the secondary cylinder 44 is positioned between the handle 28 and the primary cleaning cylinder 42. The secondary cylinder 44 is likewise powered by way of the electric motor either through a geared interconnection or by way of a belt. In the preferred embodiment, a belt 66 extends between the motor 34 and an end 64 of secondary cylinder 44. An additional belt 68 can then be coupled between the (ends 48 and 64) of first and second cylinders (42 and 44). This belt 68 can be formed into a figure "8" shape so as to cause the cylinders (42 and 44) to rotate in an opposite sense from one another (note FIG. 4). Yet a geared interconnection 72 can alternatively be used to transfer power directly from the motor 38 to the primary and secondary cylinders (note FIG. 7).

The secondary cylinder 44 likewise includes a series of tines 74 that extend from the outer surface 62. The tines 74 of the secondary cylinder 44 share a similar construction and can be made from the same material as the tines 52 of the primary cylinder 42. As illustrated, the primary and secondary cylinders (42 and 44) are located close enough to one another such that their corresponding tines (52 and 74) intermesh. The exact spacing of the cylinders will depend upon the length of the tines as well as the size of the cylinders. In the preferred embodiment, the primary and secondary cylinders (42 and 44) have a similar outer diameter and are supplied with an equal source of power, thereby insuring that the two sets of tines (52 and 74) rotate at an equal speed.

The collection tray 76 is positioned within the housing 22 intermediate to handle 28 and the secondary cleaning cylinder 44. In the preferred embodiment, collection tray 76 includes a leading edge 78 that is serrated. Leading edge 78 refers to the edge that is positioned closer to the distal end 26 of the housing 22. The collection tray 76 is further position such that the tines 74 of the secondary cleaning cylinder 44 can intermesh or otherwise cooperate with the leading edge 78.

Figure 5:
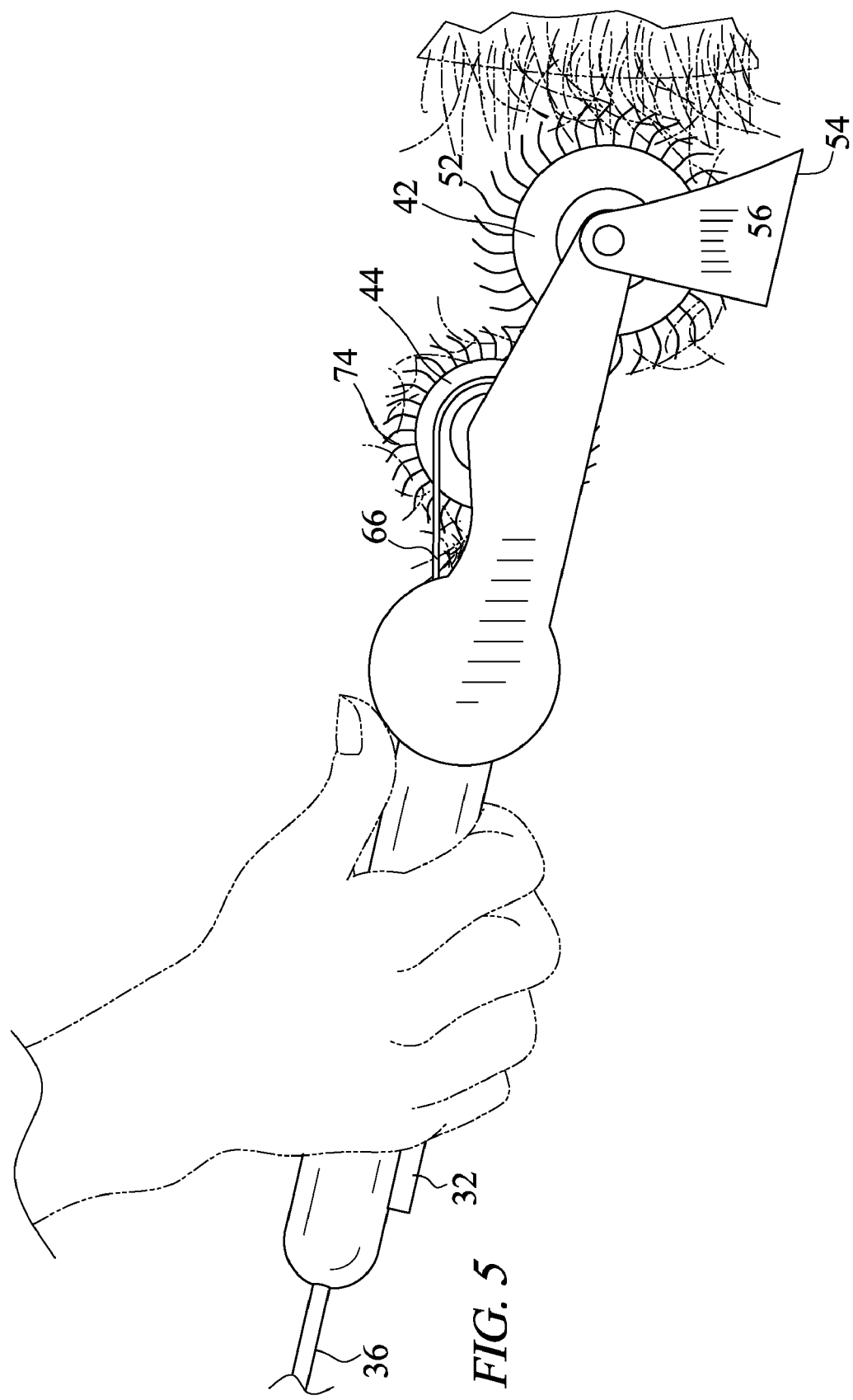
FIG. 5 is a view illustrating the brush being used on an animal.

Thus, in use, a user would use the brush to clean the fur of the animal by running the brush 20 over the animals fur and allowing the tines 52 of the primary cleaning cylinder 42 to run through the fur (note FIG. 5). The guard 54 can be positioned so as to prevent the tines 52 from contacting or otherwise gouging the animal's skin. Over time the primary tines 52 will collect a volume of fur that would otherwise prevent the continued cleaning of the animal. However, by way of the present invention, the collected fur is taken up by the secondary cylinder 44 by way of the intermeshing of the first and second tines (52 and 74) (note FIG. 4). Namely, the primary cylinder 42 brings the collected hair into contact with the counter-rotating secondary cylinder 44. This causes the collected hair to be transferred from the primary 42 to the secondary cylinder 44. Thereafter, the secondary tines 74 are made to deposit the collected fur into the tray 76 by way of the interaction between the secondary tines 74 and the serrated edge 78 of the tray 76.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted without departing from the spirit and scope of the invention.

What is claimed is:

1. A self cleaning rotary brush for cleaning the fur of an animal while protecting the underlying skin, the brush comprising:

a housing including a proximal end with a handle and a distal end;

an electric motor positioned within the housing;

a primary cleaning cylinder with an outer surface and opposing ends, the opposing ends being rotatably coupled to the distal end of the housing, the primary cleaning cylinder being powered by the electric motor for rotation in a first direction, the primary cleaning cylinder including a series of primary tines extending from the outer surface, the primary tines functioning to clean the fur of the animal;

an arcuate guard having opposing sides that are rotatably coupled to the opposing ends of the primary cleaning cylinder, the arcuate guard further including a shield integrally formed between the opposing sides, the shield functioning to protect the skin of the animal while the fur is being cleaned;

a secondary cleaning cylinder with an outer surface and opposed ends, the opposed ends being rotatably coupled to the distal end of the housing at a position intermediate the handle and the primary cleaning cylinder, the secondary cylinder being powered by the electric motor for rotation in a second direction, the second direction being opposite to the first direction, the secondary cleaning cylinder including a series of secondary tines extending from the outer surface, the primary and secondary cylinders being positioned such that the primary and secondary tines intermesh;

a collection tray with a serrated leading edge, the collection tray positioned within the housing at a location intermediate the handle and the secondary cleaning cylinder, the collection tray being positioned such that the secondary tines intermesh with the serrated leading edge, whereby rotation of the primary cylinder causes the primary tines to collect fur from the animal being cleaned and whereby the intermeshing of the primary and secondary tines causes the collected fur to be taken up by the secondary tines and whereby the intermeshing of the secondary tines with the serrated leading edge causes the collected fur to be deposited in the collection tray.

* * * * *